(12) United States Patent
Sasaki et al.

(10) Patent No.: US 8,541,479 B2
(45) Date of Patent: Sep. 24, 2013

(54) LOW RESILIENCE FLEXIBLE POLYURETHANE FOAM AND PROCESS FOR ITS PRODUCTION

(75) Inventors: Takayuki Sasaki, Kamisu (JP); Takashi Ito, Kamisu (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 11/876,237

(22) Filed: Oct. 22, 2007

(65) Prior Publication Data
US 2008/0114088 A1    May 15, 2008

Related U.S. Application Data

(63) Continuation of application No. PCT/JP2006/308316, filed on Apr. 20, 2006.

(30) Foreign Application Priority Data

Apr. 21, 2005    (JP) .................................. 2005-123582

(51) Int. Cl.
*C08G 18/28*    (2006.01)

(52) U.S. Cl.
USPC ............ 521/174; 521/117; 521/130; 521/170

(58) Field of Classification Search
USPC .................. 521/117, 130, 170, 174
See application file for complete search history.

(56) References Cited

U.S. PATENT DOCUMENTS

| | | | | |
|---|---|---|---|---|
| 4,950,695 A * | 8/1990 | Stone | ............................. | 521/157 |
| 5,484,817 A * | 1/1996 | Patterson | ........................ | 521/116 |
| 5,668,378 A * | 9/1997 | Treboux et al. | .......... | 252/182.27 |
| 6,391,935 B1 | 5/2002 | Hager et al. | | |
| 6,420,443 B1 * | 7/2002 | Clark et al. | ................... | 521/114 |
| 6,491,846 B1 * | 12/2002 | Reese et al. | .............. | 252/182.27 |
| 6,653,362 B2 | 11/2003 | Toyota et al. | | |
| 6,734,219 B2 | 5/2004 | Wada et al. | | |
| 6,756,415 B2 | 6/2004 | Kimura et al. | | |
| 6,831,112 B2 * | 12/2004 | Kaku et al. | .................... | 521/174 |
| 2004/0152797 A1 | 8/2004 | Wada et al. | | |
| 2004/0229970 A1 | 11/2004 | Sasaki et al. | | |
| 2006/0160912 A1 | 7/2006 | Sasaki et al. | | |
| 2006/0160913 A1 | 7/2006 | Sasaki et al. | | |
| 2006/0205834 A1 | 9/2006 | Sasaki et al. | | |

FOREIGN PATENT DOCUMENTS

| | | |
|---|---|---|
| CN | 1602323 A | 3/2005 |
| EP | 1 457 508 A1 | 9/2004 |
| JP | 4-146916 | 5/1992 |
| JP | 8-231676 | 9/1996 |
| JP | 9-151234 | 6/1997 |
| JP | 11-286566 | 10/1999 |
| JP | 2002-265555 | 9/2002 |
| JP | 2002-293867 | 10/2002 |
| JP | 2003-522235 | 7/2003 |
| JP | 2004-2594 | 1/2004 |
| JP | 2004-43561 | 2/2004 |
| JP | 2004-527623 | 9/2004 |
| JP | 2004-300352 | 10/2004 |
| JP | 2004-530767 | 10/2004 |
| JP | 2006-63254 | 3/2006 |
| WO | WO 01/57104 A2 | 8/2001 |
| WO | WO 01/57104 A3 | 8/2001 |

OTHER PUBLICATIONS

U.S. Appl. No. 11/944,002, filed Nov. 21, 2007, Sasaki, et al.
U.S. Appl. No. 11/944,730, filed Nov. 26, 2007, Sasaki, et al.
U.S. Appl. No. 11/944,665, filed Nov. 26, 2007, Sasaki, et al.
U.S. Appl. No. 11/944,799, filed Nov. 26, 2007, Sasaki, et al.
U.S. Appl. No. 11/749,994, filed May 17, 2007, Kimura, et al.
U.S. Appl. No. 11/752,600, filed May 23, 2007, Sasaki, et al.
U.S. Appl. No. 12/200,145, filed Aug. 28, 2008, Sasaki, et al.
U.S. Appl. No. 12/210,509, filed Sep. 15, 2008, Sasaki, et al.
U.S. Appl. No. 12/412,416, filed Mar. 27, 2009, Sasaki, et al.
U.S. Appl. No. 12/429,762, filed Apr. 24, 2009, Sasaki, et al.
U.S. Appl. No. 12/719,930, filed Mar. 9, 2010, Sasaki, et al.
U.S. Appl. No. 12/732,778, filed Mar. 26, 2010, Sasaki, et al.
Extended European Search Report issued Feb. 23, 2012, in Patent Application No. 06745497.5.
U.S. Appl. No. 11/876,237, filed Oct. 22, 2007, Sasaki, et al.

\* cited by examiner

*Primary Examiner* — John Cooney

(74) *Attorney, Agent, or Firm* — Oblon, Spivak, McClelland, Maier & Neustadt, L.L.P.

(57) ABSTRACT

To provide a flexible polyurethane foam which is excellent in low resiliency and durability without using a plasticizer and which shows little change in hardness against a change in temperature and at the same time, has high air permeability. A process for producing a flexible polyurethane foam, which comprises reacting a polyol mixture comprising polyol (A), polyol (B) and monool (D) with a polyisocyanate compound in the presence of a blowing agent etc. at an isocyanate index of at least 90. Polyol (A) is a polyether polyol having an average of 2-3 hydroxyl groups and a hydroxyl value of from 10 to 90 mgKOH/g, obtained by ring-opening addition polymerization of an alkylene oxide to an initiator using a double metal cyanide complex catalyst; Polyol (B) is a polyether polyol having an average of 2-3 hydroxyl groups and a hydroxyl value of from 15 to 250 mgKOH/g, other than the polyol (A); and Monool (D) is a polyether monool having a hydroxyl value of from 10 to 200 mgKOH/g.

9 Claims, No Drawings

LOW RESILIENCE FLEXIBLE POLYURETHANE FOAM AND PROCESS FOR ITS PRODUCTION

TECHNICAL FIELD

The present invention relates to a low resilience flexible polyurethane foam and a process for its production.

BACKGROUND ART

Heretofore, a flexible polyurethane foam having a low rebound resilience i.e. low resiliency, has been used for a shock absorber, a sound absorbent or a vibration absorber. Further, it is known that when it is used as a cushion material for chairs, mattress, etc., the body pressure distribution will be more uniform, whereby feeling of fatigue, pressure sores, etc. will be reduced. As an example, a low resilience polyurethane foam disclosed in Patent Document 1, is known.

The low resilience polyurethane foam is a low resilience polyurethane foam obtainable by reacting a composition of polyurethane foam materials comprising a polyol, a polyisocyanate, a catalyst and a blowing agent, and it has glass transition points within temperature ranges of from −70° C. to −20° C. and from 0° C. to 60° C., respectively. Further, it is disclosed that when the glass transition points are represented by peak values of tan δ obtainable by dynamic viscoelastic measurement at a frequency of 10 Hz, the peak value of tan δ within a temperature range of from −70° C. to −20° C. is at least 0.15, and the peak value of tan δ within a temperature range of from 0° C. to 60° C. is at least 0.3.

It is disclosed that the low resilience polyurethane foam has excellent low resiliency at room temperature, since it has a glass transition point within a temperature range of from 0° C. to 60° C., and there is not substantial increase in hardness at low temperatures, since it has a glass transition point within a temperature range of from −70° C. to −20° C.

However, a low resilience polyurethane foam having a glass transition point in the vicinity of room temperature has had a problem so-called temperature sensitivity such that as the working temperature departs from the glass transition point, the hardness tends to change, and the low resiliency tends to be unstable.

Further, in recent years, the level of durability required for a flexible polyurethane foam has become increasingly high. It is desired to further lower the resiliency and to develop a low resilience flexible polyurethane foam having a rebound resilience of at most 5%.

It is usually possible to lower the resiliency (rebound resilience) of a flexible polyurethane foam by incorporating a plasticizer to the flexible polyurethane foam. Accordingly, by adding a proper amount of a plasticizer, it is possible to obtain a flexible polyurethane foam having a desired low resiliency to some extent. However, the added plasticizer is likely to elute, for example, when the flexible polyurethane foam is washed, and, for example, it has been difficult to maintain the low resiliency of the flexible polyurethane foam after washing it repeatedly.

Further, a low resilience flexible polyurethane foam usually has low air permeability. Namely, it is known that the air permeability of a flexible polyurethane foam usually decreases as the resiliency decreases. In a case where a low resilience polyurethane foam is applied particularly to bedding, if the air permeability is low, humidity (mainly released from human body) tends to be hardly dissipated, thus leading to a so-called humid state. A low resilience polyurethane foam for bedding has been required to reduce such a humid state and to dissipate the heat and humidity. Further, when the usage state of bedding is taken into consideration, as a flexible polyurethane foam is to be used in a compressed state, it is required to exhibit substantially higher air permeability in a test for air permeability as measured usually in a non-compressed state. Further, in consideration of the fact that it is compressed in a humid state, the durability in a humid state is required. As an index for the durability in a humid state, the wet heat compression set may be mentioned.

As a method to solve the above problems and to improve the air permeability of a low resilience polyurethane foam, a method of employing a low molecular weight polyhydric alcohol as a raw material polyol has been proposed, as disclosed in Patent Documents 2 and 3. However, the low resilience polyurethane foam obtained by such a method has a problem with respect to the durability, and the restoration performance tends to gradually deteriorate. Further, in Patent Document 4, a low resilience polyurethane foam is obtained by using a polyether polyester polyol and a phosphorus-containing compound. However, the phosphorus-containing compound shows the same behavior as a plasticizer and is likely to elute from the flexible polyurethane foam, whereby it is expected to be difficult to maintain the performance after repeating the washing.

Further, Patent Document 5 discloses a method for producing a low resilience polyurethane foam having a good air permeability by using a monool in combination for the production. However, this method has a problem that the after-mentioned durability in a humidified state is poor. In Patent Documents 6 and 7, a method of employing a polyol composition containing a specific monool is proposed. However, in such a method, a low molecular weight polyether triol is used in a large amount, and the above-mentioned problem of temperature sensitivity has not yet been solved.

Patent Document 1: JP-A-11-286566
Patent Document 2: JP-A-2004-2594
Patent Document 3: JP-A-2004-43561
Patent Document 4: JP-A-9-151234
Patent Document 5: JP-A-2004-300352
Patent Document 6: JP-A-2003-522235
Patent Document 7: JP-A-2004-530767

DISCLOSURE OF THE INVENTION

Object to be Accomplished by the Invention

Accordingly, it is an object of the present invention to provide a flexible polyurethane foam which is excellent in low resiliency without using a plasticizer and excellent in durability and which shows little change in hardness against a temperature change (the temperature sensitivity is suppressed) and at the same time, has high air permeability, and a process for its production.

Means to Accomplish the Object

The process for producing a flexible polyurethane foam of the present invention is a process for producing a flexible polyurethane foam, which comprises reacting a polyol mixture with a polyisocyanate compound in the presence of a urethane-forming catalyst, a blowing agent and a foam stabilizer, characterized in that the polyol mixture comprises the following polyol (A), the following polyol (B) and the following monool (D), and the proportion of the polyisocyanate compound to all active hydrogen-containing compounds in the material is at least 90 by isocyanate index, wherein:

Polyol (A) is a polyether polyol having an average of 2-3 hydroxyl groups and a hydroxyl value of from 10 to 90 mgKOH/g, obtained by ring-opening addition polymerization of an alkylene oxide to an initiator using a double metal cyanide complex catalyst;

Polyol (B) is a polyether polyol having an average of 2-3 hydroxyl groups and a hydroxyl value of from 15 to 250 mgKOH/g, other than the polyol (A); and Monool (D) is a polyether monool having a hydroxyl value of from 10 to 200 mgKOH/g.

Further, the proportions of the polyol (A) and the polyol (B) are preferably such that the proportion of the polyol (A) to the total of the polyol (A) and the polyol (B) is from 5 to 50 mass %. Further, the proportion of the monool (D) is preferably from 1 to 30 parts by mass per 100 parts by mass of the total of the polyol (A) and the polyol (B).

Further, the polyol (A) is preferably a polyoxypropylene polyol obtained by ring-opening addition polymerization of only propylene oxide to an initiator. Further, the monool (D) is preferably a polyoxypropylene monool obtained by ring-opening addition polymerization of only propylene oxide to an initiator. Further, the above polyol mixture preferably further contains the following polyol (C) in an amount of at most 10 mass % based on the entire polyol mixture. Here, the polyol (C) is a polyol having an average of 2-6 hydroxyl groups and a hydroxyl value of from 300 to 1,830 mgKOH/g.

Further, the flexible polyurethane foam of the present invention is a flexible polyurethane foam produced by reacting a polyol mixture with a polyisocyanate compound in the presence of a urethane-forming catalyst, a blowing agent and a foam stabilizer, characterized in that the polyol mixture comprises the following polyol (A), the following polyol (B) and the following monool (D), and the proportion of the polyisocyanate compound to all active hydrogen-containing compounds in the material is at least 90 by isocyanate index, wherein:

Polyol (A) is a polyether polyol having an average of 2-3 hydroxyl groups and a hydroxyl value of from 10 to 90 mgKOH/g, obtained by ring-opening addition polymerization of an alkylene oxide to an initiator using a double metal cyanide complex catalyst;

Polyol (B) is a polyether polyol having an average of 2-3 hydroxyl groups and a hydroxyl value of from 15 to 250 mgKOH/g, other than the polyol (A); and Monool (D) is a polyether monool having a hydroxyl value of from 10 to 200 mgKOH/g.

Further, the flexible polyurethane foam preferably has a rebound resilience of the core of at most 15% and an air permeability of from 30 to 100 L/min.

Effects of the Invention

The flexible polyurethane foam of the present invention is excellent in low resiliency without using a plasticizer and excellent in durability, and it shows little change in hardness against a temperature change and at the same time has high air permeability. Further, according to the process for producing a flexible polyurethane foam of the present invention, it is possible to produce a flexible polyurethane foam which is excellent in low resiliency without using a plasticizer and excellent in durability and which shows little change in hardness against a temperature change and at the same time, has high air permeability.

BEST MODE FOR CARRYING OUT THE INVENTION

The flexible polyurethane foam of the present invention is produced by reacting a polyol mixture with a polyisocyanate compound in the presence of a urethane-forming catalyst, a blowing agent and a foam stabilizer. Now, the respective materials will be described.

Polyols

The polyol mixture to be used in the present invention comprises the following polyol (A), polyol (B) and monool (D) Further, it preferably contains polyol (C).

Polyol (A)

The polyol (A) in the present invention is a polyether polyol (a polyoxyalkylene polyol) having an average of 2-3 hydroxyl groups and a hydroxyl value of from 10 to 90 mgKOH/g, obtained by ring-opening addition polymerization of an alkylene oxide to an initiator by means of a double metal cyanide complex catalyst (DMC catalyst). Namely, the polyol (A) is a polyether polyol having a polyoxyalkylene chain obtained by ring-opening addition polymerization of an alkylene oxide by means of a double metal cyanide complex catalyst. By the use of is the double metal cyanide complex catalyst, a by-product monool can be reduced, and a polyol having a narrow molecular weight distribution can be produced. The polyol having a narrow molecular weight distribution has a low viscosity as compared with a polyol having a wide molecular weight distribution in a molecular weight region of the same level (a polyol having the same hydroxyl value) whereby it is excellent in blendability of reactive materials, and the stability of foam during the production of the flexible polyurethane foam will be improved.

As the double metal cyanide complex catalyst, one disclosed in JP-B-46-27250 may, for example, be used. As a specific example, a complex containing zinc hexacyanocobaltate as the main component may be mentioned, and its ether and/or alcohol complex is preferred. The ether may, for example, be preferably ethylene glycol dimethyl ether (glime), diethylene glycol dimethyl ether (diglime), ethylene glycol mono-tert-butyl ether (METB), ethylene glycol mono-tert-pentyl ether (METP), diethylene glycol mono-tert-butyl ether (DETB) or tripropylene glycol monomethyl ether (TPME). The alcohol may, for example, be preferably tert-butyl alcohol.

The alkylene oxide to be used for the production of the polyol (A) may, for example, be ethylene oxide, propylene oxide, 1,2-epoxybutane or 2,3-epoxybutane. Among them, propylene oxide, or a combination of propylene oxide and ethylene oxide, is preferred. Particularly preferred is propylene oxide alone. Namely, as the polyol (A) a polyoxypropylene polyol obtained by ring-opening addition polymerization of only propylene oxide to an initiator is preferred. It is preferred to use only propylene oxide, whereby the durability in a humidified state will be improved.

As the initiator to be used for the production of the polyol (A), a compound having 2 or 3 active hydrogen atoms in its molecule may be used alone, or such compounds may be used in combination. Specific examples of the compound having 2 active hydrogen atoms include ethylene glycol, propylene glycol, 1,4-butanediol, diethylene glycol and dipropylene glycol. Further, specific examples of the compound having 3 active hydrogen atoms include glycerol and trimethylol propane. Further, it is preferred to employ a polyether polyol having a high hydroxyl value obtained by ring-opening addition polymerization of an alkylene oxide, preferably propylene oxide, to such a compound. Specifically, it is preferred to employ a high hydroxyl value polyether polyol (preferably polyoxypropylene polyol) having a molecular weight per hydroxyl group of from about 200 to 500, i.e. a hydroxyl value of from 110 to 280 mgKOH/g.

In the present invention, the polyol (A) has an average of 2-3 hydroxyl groups. In the present invention, the average number of hydroxyl groups means an average in number of active hydrogen atoms in the initiator. By adjusting the average number of hydroxyl groups to 2-3, it is possible to avoid a trouble of remarkable deterioration of the physical properties such as the dry heat compression set of the obtainable flexible polyurethane foam. Further, it is possible to avoid troubles such as a decrease in elongation of the obtainable flexible polyurethane foam and an increase in hardness to deteriorate the physical properties such as the tensile strength. As the polyol (A), it is preferred to employ a polyether diol having 2 hydroxyl groups in an amount of from 50 to 100 mass % based on the polyol (A), whereby the temperature sensitivity may easily be suppressed.

In the present invention, the polyol (A) has a hydroxyl value of from 10 to 90 mgKOH/g. By adjusting the hydroxyl value to be at least 10 mgKOH/g, it is possible to constantly produce the flexible polyurethane foam by suppressing collapse, etc. Further, by adjusting the hydroxyl value to be at most 90 mgKOH/g, it is possible to control the rebound resilience to be low without impairing the flexibility of the flexible polyurethane foam thereby produced. The hydroxyl value of the polyol (A) is more preferably from 10 to 60 mgKOH/g, most preferably from 15 to 60 mgKOH/g.

In the present invention, the unsaturation value of the polyol (A) is preferably at most 0.05 meq/g, further preferably at most 0.01 meq/g, particularly preferably at most 0.006 meq/g. By adjusting the unsaturation value to be at most 0.05 meq/g, it is possible to avoid a trouble of deterioration of the durability of the obtainable flexible polyurethane foam. The lower limit of the unsaturation value is ideally 0 meq/g.

The polyol (A) in the present invention may be a polymer-dispersed polyol. The polyol (A) being a polymer-dispersed polyol means that it constitutes a dispersion system wherein the polyol (A) is a base polyol (dispersing medium), and fine polymer particles (dispersoid) are stably dispersed.

As the fine polymer particles, an addition polymerization type polymer or a condensation polymerization type polymer may be mentioned. The addition polymerization type polymer may, for example, be obtained by homopolymerizing or copolymerizing a monomer such as acrylonitrile, styrene, a methacrylate or an acrylate. Further, the condensation polymerization type polymer may, for example, be polyester, polyurea, polyurethane or polymethylol melamine. By the presence of fine polymer particles in the polyol, the hydroxyl value of the polyol can be controlled to be low, and it is effective to improve the mechanical properties such that the hardness of the flexible polyurethane foam can be increased. The content of the fine polymer particles in the polymer-dispersed polyol is not particularly limited, but it is preferably from 0 to 5 mass %, based on the entire polyol (A). Here, various physical properties (such as the unsaturation value, the hydroxyl value, etc.) as the polyol of such a polymer-dispersed polyol are considered with respect to the base polyol excluding the fine polymer particles.

Polyol (B)

The polyol (B) in the present invention is a polyether polyol having an average of 2-3 hydroxyl groups and a hydroxyl value of from 15 to 250 mgKOH/g and is a polyether polyol other than the above polyol (A). Namely, it is a polyether polyol obtained by ring-opening addition polymerization of an alkylene oxide to an initiator by means of an alkylene oxide ring-opening addition polymerization catalyst. Here, a polyether polyol produced by using a double metal cyanide complex catalyst as the alkylene oxide ring-opening addition polymerization catalyst, is not included in the polyol (B).

The alkylene oxide ring-opening addition polymerization catalyst to be used for the production of the polyol (B) is preferably a phosphazenium compound, a Lewis acid compound or an alkali metal compound catalyst. Among them, the alkali metal compound catalyst is particularly preferred. As the alkali metal compound catalyst, potassium hydroxide (KOH) or cesium hydroxide (CsOH) may, for example, be mentioned.

The alkylene oxide to be used for the production of the polyol (B) may, for example, be ethylene oxide, propylene oxide, 1,2-epoxybutane or 2,3-epoxybutane. Among them, propylene oxide, or a combination of propylene oxide and ethylene oxide, is preferred.

As the polyol (B), it is preferred to employ a polyoxypropylene polyol obtainable by ring-opening addition polymerization of only propylene oxide to an initiator, whereby the durability in a humidified state will be improved. Further, as the polyol (B), it is preferred to use a polyoxypropylene polyol obtainable by ring-opening addition polymerization of only propylene oxide to an initiator and a polyoxypropyleneoxyethylene polyol having an oxyethylene group content of from 50 to 100 mass % in the oxyalkylene groups, obtainable by ring-opening addition polymerization of a mixture of propylene oxide and ethylene oxide, in combination, whereby the durability in a humidified state will further be improved. In a case where such a polyoxypropyleneoxyethylene polyol is to be used, it is preferably used in an amount of from 1 to 20 mass %, more preferably from 2 to 10 mass %, in the polyol (B).

As the initiator to be used for the production of the polyol (B), a compound having 2 or 3 active hydrogen atoms in its molecule may be used alone or such compounds may be used in combination. Specific examples of the compound having 2 or 3 active hydrogen atoms include a is polyhydric alcohol such as ethylene glycol, propylene glycol, 1,4-butanediol, diethylene glycol, dipropylene glycol, glycerol or trimethylol propane; a polyhydric phenol such as bisphenol A; and an amine such as monoethanolamine, diethanolamine, triethanolamine or piperazine. Among them, a polyhydric alcohol is particularly preferred. Further, it is preferred to employ a high hydroxyl value polyether polyol obtained by ring-opening addition polymerization of an alkylene oxide, preferably propylene oxide, to such a compound.

In the present invention, the average number of hydroxyl groups in the polyol (B) is 2-3. By adjusting the average number of hydroxyl groups to 2-3, it is possible to avoid a trouble of remarkable deterioration of the physical properties such as the dry heat compression set of the obtainable flexible polyurethane foam, and it is possible to avoid troubles such as a decrease in elongation of the obtainable flexible polyurethane foam or an increase in hardness to deteriorate the physical properties such as the tensile strength. The average number of hydroxyl groups in the polyol (B) is preferably 2.0-2.7, more preferably 2.0-2.6. By adjusting the average number of hydroxyl groups in the polyol (B) within the above range, it is possible to control the rebound resilience to be low and it is possible to obtain a flexible urethane foam showing little change in hardness (having low temperature sensitivity).

Further, as the polyol (B), it is preferred to use a polyether diol having an average of 2 hydroxyl groups and a polyether triol having an average of 3 hydroxyl groups, in combination. The proportion of the polyether diol having an average of 2 hydroxyl groups in the polyol (B) is preferably at least 40 mass %, more preferably at least 45 mass %. By adjusting the average number of hydroxyl groups within the above range, the rebound resilience can be controlled to be low, and it is possible to obtain a flexible urethane foam showing little change in hardness (having low temperature sensitivity).

In the present invention, the hydroxyl value of the polyol (B) is from 15 to 250 mgKOH/g. By adjusting the hydroxyl value to be at least 15 mgKOH/g, it is possible to constantly produce the flexible polyurethane foam by suppressing collapse, etc. Further, by adjusting the hydroxyl value to be at most 250 mgKOH/g, it is possible to control the rebound resilience to be low without impairing the flexibility of the flexible polyurethane foam thereby produced.

As the polyol (B), it is preferred to employ a polyol having a hydroxyl value of from 100 to 250 mgKOH/g, more preferably a polyol having a hydroxyl value of from 100 to 200 mgKOH/g. Further, as the polyol (B), it is more preferred to use a polyol having a hydroxyl value of from 100 to 250 mgKOH/g (more preferably from 100 to 200 mgKOH/g) and a polyol having a hydroxyl value of from 15 to 99 mgKOH/g (more preferably from 15 to 60 mgKOH/g) in combination.

The polyol (B) in the present invention may be a polymer-dispersed polyol. As the polymer for fine polymer particles, the same one as described above with respect to the polyol (A) may, for example, be mentioned. Further, the content of the fine polymer particles in the polymer-dispersed polyol is not particularly limited, but it is preferably from 0 to 10 mass %, based on the entire polyol (B).

As the polyol (B) in the present invention, it is preferred to employ a polyoxypropylene polyol having a hydroxyl value of from 100 to 250 mgKOH/g (more preferably 100 to 200 mgKOH/g), obtainable by ring-opening addition polymerization of only propylene oxide to an initiator, whereby the durability in a humidified state will be improved. Further, as the polyol (B), it is particularly preferred to use a polyoxypropylene polyol having a hydroxyl value of from 100 to 250 mgKOH/g (more preferably from 100 to 200 mgKOH/g), obtainable by ring-opening addition polymerization of only propylene oxide to an initiator, and a polyoxypropyleneoxyethylene polyol having an oxyethylene group content of from 50 to 100 mass % and a hydroxyl value of from 15 to 99 mgKOH/g (more preferably from 15 to 60 mgKOH/g), obtainable by ring-opening addition polymerization of a mixture of propylene oxide and ethylene oxide, in combination, whereby the durability in a humidified state will further be improved.

Polyol (C)

The polyol (C) in the present invention is a polyol having an average of 2-6 hydroxyl groups and a hydroxyl value of from 300 to 1,830 mgKOH/g. The polyol to be used as the polyol (C) may, for example, be a polyhydric alcohol, an amine having from 2 to 6 hydroxyl groups, a polyester polyol, a polyether polyol or a polycarbonate polyol. By the use of the polyol (C), it functions as a crosslinking agent, whereby the mechanical properties such as the hardness will be improved. Further, in the present invention, it is observed that the polyol (C) has a cell-opening effect, and addition of the polyol (C) is effective to improve the air permeability. Especially, also in a case where a flexible polyurethane foam having a low density (light weight) is to be produced by using a large amount of a blowing agent, the foam stability will be good.

The polyhydric alcohol may, for example, be ethylene glycol, propylene glycol, 1,4-butanediol, dipropylene glycol, glycerol, diglycerol or pentaerythritol. The amine having from 2 to 6 hydroxyl groups may, for example, be diethanolamine or triethanolamine. The polyether polyol may, for example, be a polyether polyol obtained by ring-opening addition polymerization of an alkylene oxide to an initiator. The initiator to be used for the production of the polyol (C) which is a polyether polyol, may, for example, be a polyhydric alcohol which may be used also as the polyol (C), or an initiator to be used for the production of the polyol (B).

The alkylene oxide to be used for the production of the polyol (C) which is a polyether polyol, may, for example, be ethylene oxide, propylene oxide, 1,2-epoxybutane or 2,3-epoxybutane. Among them, propylene oxide or a combination of propylene oxide and ethylene oxide, is preferred. Particularly preferred is propylene oxide alone. Namely, as the polyol (C) which is a polyether polyol, a polyoxypropylene polyol obtained by ring-opening addition polymerization of only propylene oxide to an initiator, is preferred. As the polyol (C), a polyether polyol is preferred, and a polyoxypropylene polyol is particularly preferred among them. The use of propylene oxide alone is preferred, since the durability in a humidified state will thereby be improved. As the polyol (C), one type may be used alone, or two or more types may be used in combination.

In the present invention, the polyol (C) has an average of 2-6 hydroxyl groups, preferably from 3-4 hydroxyl groups. Further, the polyol (C) has a hydroxyl value of preferably from 300 to 1,830 mgKOH/g, particularly preferably from 300 to 600 mgKOH/g.

Monool (D)

The monool (D) in the present invention is a polyether monool having a hydroxyl value of from 10 to 200 mgKOH/g. Namely, it is a polyether monool obtained by ring-opening addition polymerization of an alkylene oxide to an initiator having one active hydrogen atom by means of an alkylene oxide ring-opening addition polymerization catalyst.

The alkylene oxide ring-opening addition polymerization catalyst to be used for the production of the monool (D) is preferably a double metal cyanide complex catalyst, a phosphazenium compound, a Lewis acid compound or an alkali metal compound catalyst. Among them, a double metal cyanide complex catalyst is particularly preferred. Namely, the monool (D) is preferably a polyether monool having a polyoxyalkylene chain, obtained by ring-opening addition polymerization of an alkylene oxide by means of a double metal cyanide complex catalyst.

The alkylene oxide to be used for the production of the monool (D) may, for example, be ethylene oxide, propylene oxide, 1,2-epoxybutane or 2,3-epoxybutane. Among them, propylene oxide, or a combination of propylene oxide and ethylene oxide, is preferred. Particularly preferred is propylene oxide alone. Namely, as the monool (D), a polyoxypropylene monool obtained by ring-opening addition polymerization of only propylene oxide to an initiator, is preferred. The use of only propylene oxide is preferred, since the durability in a humidified state will be thereby improved.

As the initiator to be used for the production of the monool (D), a compound having only one active hydrogen atom, is used. Specifically, it may, for example, be a monool such as methanol, ethanol, n-propyl alcohol, isopropyl alcohol, n-butyl alcohol or tert-butyl alcohol; a monohydric phenol such as phenol or nonylphenol; or a secondary amine such as dimethylamine or diethylamine.

In the present invention, the monool (D) has an average of one hydroxyl group. Further, the monool (D) has a hydroxyl value of from 10 to 200 mgKOH/g, preferably from 10 to 120 mgKOH/g.

Polyol Mixture

The polyol mixture in the present invention comprises the above-mentioned polyol (A), the above-mentioned polyol (B) and the above-mentioned monool (D). Further, this polyol mixture preferably contains the above-mentioned polyol (C).

In the polyol mixture of the present invention, the proportions of the polyol (A) and the polyol (B) are such that the proportion of the polyol (A) to the total (100 mass %) of the polyol (A) and the polyol (B) is preferably from 5 to 50 mass %, more preferably from 10 to 30 mass %. By adjusting the proportion of the polyol (A) in the polyol mixture to be within the above range, it is possible to obtain a flexible polyurethane foam having low resiliency and showing little change in hardness and rebound resilience against a temperature change (having low temperature sensitivity).

Further, in the polyol mixture (100 mass %), the proportion of the total of the polyol (A) and the polyol (B) is preferably at least 75 mass %, more preferably at least 80 mass %, particularly preferably at least 85 mass %, especially preferably at least 90 mass %. By adjusting the proportion of the total of the polyol (A) and the polyol (B) in the polyol mixture to be within the above range, it is possible to obtain a flexible polyurethane foam which is excellent in low resiliency and durability and which has good air permeability.

Further, the proportion of the monool (D) is preferably from 1 to 30 parts by mass per 100 parts by mass of the total of the polyol (A) and the polyol (B), and when tin 2-ethylhexanoate is used as a urethane-forming catalyst, it is more preferably from 1 to 10 parts by mass, most preferably from 2 to 8 parts by mass. Further, when dibutyltin dilaurate is used as a urethane-forming catalyst, it is more preferably from 5 to 30 parts by mass. By adjusting the proportion of the monool (D) to be within the above range, it is possible to obtain a flexible polyurethane foam which is excellent in low resiliency and durability and which has good air permeability.

Further, the proportion of the polyol (C) in the polyol mixture (100 mass %) is preferably from 0 to 10 mass %, more preferably from 0 to 5 mass %, particularly preferably from 0.5 to 2 mass %. By adjusting the proportion of the polyol (C) to be within the above range, it is possible to improve the air permeability while further lowering the low resiliency of the flexible polyurethane foam.

Further, in the polyol mixture in the present invention, another polyol (E) may also be used which is not classified in any of the polyol (A), the polyol (B), the polyol (C) and the monool (D). The proportion of such another polyol (E) is preferably at most 10 mass %, more preferably at most 5 mass %, particularly preferably 0 mass %, in the polyol mixture (100 mass %). The proportion of such another polyol (E) being 0 mass % means that the polyol mixture comprises the polyol (A), the polyol (B) and the monool (D), and if necessary, the polyol (C), but does not contain another polyol (E).

In the present invention, a preferred composition of the polyol mixture (100 mass %) may specifically comprise, for example, from 10 to 30 mass % of the polyol (A), from 50 to 80 mass % of the polyol (B), from 0 to 5 mass % of the polyol (C) and from 2 to 24 mass % of the monool (D).

Polyisocyanate Compound

The polyisocyanate compound to be used in the present invention is not particularly limited, and it may, for example, be an aromatic, alicyclic or aliphatic polyisocyanate having at least two isocyanate groups, a mixture of at least two such polyisocyanates, or a modified polyisocyanate obtainable by modifying such a polyisocyanate.

A specific example of the polyisocyanate may, for example, be tolylene diisocyanate (TDI), diphenylmethane diisocyanate (MDI), polymethylenepolyphenyl polyisocyanate (so-called crude MDI), xylylene diisocyanate (XDI), isophorone diisocyanate (IPDI) or hexamethylene diisocyanate (HMDI). Further, a specific example of the modified polyisocyanate may, for example, be a prepolymer type modified product, a nurate modified product, a urea modified product or a carbodiimide modified product of each of the above polyisocyanates. Among them, TDI, MDI, crude MDI or a modified product thereof is preferred. Further, it is preferred to employ TDI, crude MDI or a modified product thereof (particularly preferred is a prepolymer type modified product) among them, whereby the foam stability will be improved, or the durability will be improved. Especially, it is preferred to employ a polyisocyanate compound having a relatively low reactivity among TDI, crude MDI or a modified product thereof, whereby the air permeability will be improved. Specifically, a TDI mixture wherein the proportion of 2,6-TDI is large (particularly preferably at least 30 mass %) is preferred.

The amount of the polyisocyanate compound to be used is such an amount that the proportion of all active hydrogen-containing compounds and the polyisocyanate compound in the material is at least 90 by the isocyanate index. The material comprises the polyol mixture, the polyisocyanate compound, the urethane-forming catalyst, the blowing agent and the foam stabilizer. The active hydrogen-containing compound is meant for the polyol mixture and water or the like which is useful as a blowing agent. The isocyanate index is represented by 100 times a numerical value obtained by dividing the equivalent amount of isocyanate groups in the polyisocyanate compound by the equivalent amount of the total of all active hydrogen atoms in all active hydrogen-containing compounds in the material including polyols, water, etc.

In the process for producing a flexible polyurethane foam of the present invention, the proportion of all active hydrogen-containing compounds and the polyisocyanate compound in the material is adjusted to be at least 90 by the isocyanate index. If the above proportion is less than 90 by the isocyanate index, the polyols are used excessively, the influence as the plasticizer tends to be large, and the washing durability tends to deteriorate, such being undesirable. Further, such is undesirable also from such a viewpoint that the urethane-forming catalyst tends to be readily dissipated, is or the produced flexible polyurethane foam is likely to undergo a color change. The above proportion is preferably from 90 to 130, more preferably from 95 to 110, particularly preferably from 100 to 110, by the isocyanate index.

Urethane-Forming Catalyst

As the urethane-forming catalyst for the reaction of the polyol with the polyisocyanate compound, any catalyst may be used which promotes the urethane-forming reaction. For example, a tertiary amine such as triethylene diamine, bis(2-dimethylaminoethyl) ether or N,N,N',N'-tetramethylhexamethylene diamine, a metal carboxylate such as potassium acetate or potassium 2-ethylhexanoate, or an organic metal compound such as stannous octoate or dibutyltin dilaurate, may be mentioned.

Foam Stabilizer

As a foam stabilizer, a silicone foam stabilizer or a fluorinated foam stabilizer may, for example, be mentioned. Among them, a silicone foam stabilizer is preferred. Among silicone foam stabilizers, a silicone foam stabilizer containing a polyoxyalkylene/dimethylpolysiloxane copolymer as the main component, is preferred. A commercially available foam stabilizer is a composition, and such a foam stabilizer composition may contain a polyoxyalkylene/dimethylpolysiloxane copolymer alone, or may contain another component in combination therewith. Such another component may, for example, be a polyalkylmethylsiloxane, a glycol or a polyoxyalkylene compound. As a foam stabilizer to be used in the present invention, a foam stabilizer composition comprising a polyoxyalkylene/dimethylpolysiloxane copolymer, a polyalkylmethylsiloxane and a polyoxyalkylene compound, is particularly preferred from the viewpoint of the stability of the foam. As an example of a commercial product of such a foam stabilizer composition, SZ-1328 (tradename) manufactured by Dow Corning Toray Co., Ltd. may be mentioned. Two or more of such foam stabilizers may be used in combination, or a foam stabilizer other than the above specified foam stabilizers may be used in combination.

The amount of the foam stabilizer is preferably from 0.01 to 2 parts by mass, more preferably from 0.1 to 0.5 part by mass, per 100 parts by mass of the polyol mixture.

Blowing Agent

The blowing agent is not particularly limited, and a known blowing agent such as a fluorinated hydrocarbon may be used. However, as the blowing agent to be used in the present invention, at least one member selected from the group consisting of water and an inert gas is preferred. The inert gas may specifically be, for example, air, nitrogen or carbon dioxide. Among them, water is preferred. Namely, in the present invention, it is particularly preferred to employ only water as the blowing agent.

When water is used, the amount of the blowing agent is preferably at most 10 parts by mass, more preferably from 0.1 to 4 parts by mass, per 100 parts by mass of the polyol mixture.

Other Additives

At the time of producing a flexible polyurethane foam of the present invention, desired additives may also be used in addition to the above-described urethane-forming catalyst, blowing agent and foam stabilizer. As such additives, a filler such as potassium carbonate or barium sulfate; a surfactant such as an emulsifier; an aging-preventive agent such as an antioxidant or an ultraviolet absorber; a flame retardant, a plasticizer, a coloring agent, an antifungal agent, a cell opener, a dispersant and a discoloration-preventive agent may, for example, be mentioned.

Foaming Method

The method for forming a flexible polyurethane foam of the present invention may be a method (mold method) wherein a reactive mixture is injected, foamed and molded in a closed mold, or a method (slab method) wherein a reactive mixture is foamed in an open system. A slab method is preferred. Specifically, foaming can be carried out by a known method such as a one shot method, a semiprepolymer method or a prepolymer method. For the production of a flexible polyurethane foam, a production apparatus commonly employed, may be used.

Flexible Polyurethane Foam

The flexible polyurethane foam of the present invention is a flexible polyurethane foam which is produced by the above-described process. Namely, the flexible polyurethane foam of the present invention is a flexible polyurethane foam produced by reacting a polyol mixture with a polyisocyanate compound in the presence of a urethane-forming catalyst, a blowing agent and a foam stabilizer, characterized in that the polyol mixture comprises the above-mentioned polyol (A), the above-mentioned polyol (B) and the above-mentioned monool (D), and the proportion of the polyisocyanate compound to the polyol mixture in the reaction is at least 90 by the isocyanate index.

The flexible polyurethane foam of the present invention is characterized by the low resiliency, and the rebound resilience of the core is preferably at most 15%, more preferably at most 13%, particularly preferably at most 12%, most preferably at most 10%. By adjusting the rebound resilience of the core to be at most 15%, sufficient low resiliency will be provided. The lower limit is usually 0%. The measurement of the rebound resilience of the core is carried out in accordance with JIS K6400 (1997 edition). Further, the "core" in the present invention is a portion obtained by removing the skin portion from the center portion of the flexible polyurethane foam.

The flexible polyurethane foam of the present invention is characterized in that the air permeability is good, and the air permeability is preferably from 30 to 100 L/min, more preferably from 40 to 100 L/min, particularly preferably from 70 to 100 L/min. The air permeability being within the above range means that a predetermined amount of air permeability is secured even in a compressed state. Namely, the flexible polyurethane foam of the present invention is less likely to be humidified when applied to bedding. Here, the measurement of the air permeability is carried out by a method in accordance with JIS K6400 (1997 edition).

The flexible polyurethane foam of the present invention is characterized in that the durability is good. As indices for the durability, the dry heat compression set and the wet heat compression set are used. The flexible polyurethane foam of the present invention is characterized particularly in that the wet heat compression set as an index for the durability in a humidified state, is small. Here, each of the measurements of the dry heat compression set and the wet heat compression set is carried out in accordance with JIS K6400 (1997 edition). Of the flexible polyurethane foam of the present invention, the dry heat compression set is preferably at most 6%, more preferably at most 5%, particularly preferably at most 4%, most preferably at most 3.5%. Further, of the flexible polyurethane foam of the present invention, the wet heat compression set is preferably at most 5%, more preferably at most 4%, particularly preferably at most 3.5%.

The density (core density) of the flexible polyurethane foam of the present invention is preferably from 40 to 110 $kg/m^3$, more preferably from 40 to 80 $kg/m^3$. Especially, the flexible polyurethane foam of the present invention is characterized in that even with a low density, it can be foamed and produced stably and yet is excellent in durability.

Mechanism

In the present invention, when the polyol (A) has 2 hydroxyl groups and a hydroxyl value of from 10 to 90 mgKOH/g, it contains a polyol which is completely straight-chained with no branches and has an extremely long molecular chain. It is thereby possible to obtain a flexible polyurethane foam which exhibits low resiliency derived from the polyol (A) which is straight-chained and has an extremely long molecular chain and which has sufficient low resiliency, specifically the rebound resilience of the core being at most 15%. Further, when the polyol (A) has 3 hydroxyl groups and a hydroxyl value of from 10 to 90 mgKOH/g, by selectively combining a polyol having two hydroxyl groups among the polyol (B), low resiliency can be obtained.

EXAMPLES

Now, the present invention will be described in further detail with reference to Examples, but the present invention is by no means restricted by the following Examples. Further, numerical values in Examples and Comparative Examples represent parts by mass. Further, the measurement of unsaturation values was carried out by a method in accordance with JIS K1557 (1970 edition).

Materials

Polyether polyol A1: Using a potassium hydroxide catalyst and dipropylene glycol as an initiator, propylene oxide was polymerized to a molecular weight of 700, followed by refinement with magnesium silicate. Then, using the compound as an initiator, propylene oxide was subjected to ring-opening addition polymerization by using zinc hexacyanocobaltate-tert-butyl alcohol complex catalyst, to obtain a polyoxypropylene polyol having an average of 2 hydroxyl groups, a hydroxyl value of 20 mgKOH/g and an unsaturation value of 0.005 meq/g.

Polyether polyol A2: Using a potassium hydroxide catalyst and dipropylene glycol as an initiator, propylene oxide was subjected to ring-opening addition polymerization to a molecular weight of 1,000, followed by purification with magnesium silicate. Then, using the compound as an initiator, propylene oxide was subjected to ring-opening addition polymerization by using zinc hexacyanocobaltate-tert-butyl alcohol complex catalyst, to obtain a polyoxypropylene polyol having an average of 2 hydroxyl groups, a hydroxyl value of 14 mgKOH/g and an unsaturation value of 0.005 meq/g.

Polyether polyol B1: Using a potassium hydroxide catalyst and dipropylene glycol as an initiator, propylene oxide was subjected to ring-opening addition polymerization, to obtain a polyoxypropylene polyol having an average of 2 hydroxyl groups and a hydroxyl value of 160 mgKOH/g.

Polyether polyol B2: Using a potassium hydroxide catalyst and glycerol as an initiator, propylene oxide was subjected to ring-opening addition polymerization, to obtain a polyoxypropylene polyol having an average of 3 hydroxyl groups and a hydroxyl value of 168 mgKOH/g.

Polyether polyol B3: Using a potassium hydroxide catalyst and glycerol as an initiator, a mixture of propylene oxide and ethylene oxide was subjected to ring-opening addition polymerization, to obtain a polyoxypropyleneoxyethylene polyol having an average of 3 hydroxyl groups, a hydroxyl value of 48 mgKOH/g and a total oxyethylene group content of 80 mass %.

Polyether polyol C1: Using a potassium hydroxide catalyst and pentaerythritol as an initiator, propylene oxide was subjected to ring-opening addition polymerization, to obtain a polyoxypropylene polyol having an average of 4 hydroxyl groups and a hydroxyl value of 410 mgKOH/g.

Polyether polyol D1: Using n-butyl alcohol as an initiator, propylene oxide was subjected to ring-opening addition polymerization by using zinc hexacyanocobaltate-tert-butyl alcohol complex catalyst, to obtain a polyoxypropylene monool having an average of 1 hydroxyl group and a hydroxyl value of 16.7 mgKOH/g.

Blowing agent: Water

Catalyst A: Amine catalyst (tradename: Niax A-230, manufactured by Air Products and Chemicals, Inc.)

Catalyst B: Tin 2-ethylhexanoate (tradename: DABCO T-9, manufactured by Air Products and Chemicals, Inc.)

Catalyst C: Dibutyltin dilaurate (tradename: NEOSTANN U-100, manufactured by Nitto Kasei Co., Ltd.)

Catalyst D: Solution of triethylenediamine in dipropylene glycol (tradename: TEDA-L33, manufactured by TOSOH CORPORATION)

Foam stabilizer A: Silicone foam stabilizer (tradename: SZ-1328, manufactured by Dow Corning Toray Co., Ltd.)

Foam stabilizer B: Silicone foam stabilizer (tradename: L-5740S, manufactured by Dow Corning Toray Co., Ltd.)

Polyisocyanate compound a: TDI-80 (mixture of 2,4-TDI/ 2,6-TDI=80/20 mass %), isocyanate group content: 48.3 mass % (tradename: CORONATE T-80, manufactured by Nippon Polyurethane Industry Co., Ltd.)

Polyisocyanate compound b: TDI-65 (mixture of 2,4-TDI/ 2,6-TDI=65/35 mass %), isocyanate group content: 48.3 mass % (tradename: CORONATE T-65, manufactured by Nippon Polyurethane Industry Co., Ltd.)

Example 1 to 7

A mixture (polyol system) of all materials other than the polyisocyanate compound among the materials and blend agents shown in Table 1, was adjusted to a liquid temperature of 23° C.±1° C., and the polyisocyanate compound was adjusted to a liquid temperature of 22±1° C. To the polyol system, the polyisocyanate compound was added in a prescribed amount, followed by mixing for 5 seconds by a mixer (rotational speed: 1,600 rpm), and the mixture was injected at room temperature into a wooden box of 250 mm×250 mm×250 mm with an open top and lined with a plastic sheet, to prepare a flexible polyurethane foam (slab foam). The prepared flexible polyurethane foam was taken out and left to stand for 24 hours in a room adjusted to have room temperature (23° C.) and a humidity of 50%, whereupon various physical properties were measured. The measured results are shown in Table 1. Here, Examples 1 to 6 are Examples of the present invention, and Example 7 is a Comparative Example.

Examples 8 to 13

A mixture (polyol system) of all materials other than the polyisocyanate compound among the materials and blend agents shown in Table 2, was adjusted to a liquid temperature of 20° C.±1° C., and the polyisocyanate compound was adjusted to a liquid temperature of 20±1° C. To the polyol system, the polyisocyanate compound was added in a prescribed amount, followed by mixing for 5 seconds by a mixer (rotational speed: 1,100 rpm), and the mixture was injected at room temperature into a box of 1,000 mm in length, 2,000 mm in width and 700 mm in height with an open top and lined with a plastic sheet, to prepare a flexible polyurethane foam (slab foam). After the surface hardened, the surface of the flexible polyurethane foam was subjected to crushing by a hand. A prepared flexible polyurethane foam was taken out and left to stand for at least 24 hours in a room adjusted to have room temperature (23° C.) and a humidity of 50%, whereupon various physical properties were measured. The measured results are shown in Table 2. Examples 8 to 13 are Examples of the present invention.

Examples 14 and 15

A mixture (polyol system) of all materials other than the polyisocyanate compound among the materials and blend agents shown in Table 2, was adjusted to a liquid temperature of 22° C.±1° C., and the polyisocyanate compound was adjusted to a liquid temperature of 22±1° C. To the polyol system, the polyisocyanate compound was added in a prescribed amount, followed by mixing for 5 seconds by a mixer (rotational speed: 3,000 rpm), and the mixture was injected at room temperature into a box of 600 mm in length, 600 mm in width and 400 mm in height with an open top and lined with a plastic sheet, to prepare a flexible polyurethane foam (slab foam). The prepared flexible polyurethane foam was taken out and left to stand for at least 24 hours in a room adjusted to have room temperature (23° C.) and a humidity of 50%, whereupon various physical properties were measured. The measured results are shown in Table 2. Examples 14 and 15 are Examples of the present invention.

Moldability

The moldability was evaluated in such a manner that one having no shrinkage after foaming was identified by ○, one showing shrinkage and disintegration was identified by X.

Core Density, Rebound Resilience of Core

The core density and the rebound resilience of core were measured by a method in accordance with JIS K6400 (1997 edition). A sample obtained by removing the skin portion from the center portion of the foam and cutting into a size of 100 mm in length, 100 mm in width and 50 mm in height, was used for the measurement.

25% Hardness, Air Permeability, Tensile Strength, Elongation, Dry Heat Compression Set, Wet Heat Compression Set The 25% hardness (ILD), air permeability, tensile strength, elongation, dry heat compression set and wet heat compression set were measured by methods in accordance with JIS K6400 (1997 edition). Further, the air permeability was measured by a method in accordance with method B of JIS K6400 (1997 edition).

However, with respect to Examples 8 to 15, measurements of the 25% hardness, air permeability and rebound resilience of core, were carried out after crushing by a hand.

CLD Hardness, Change in Hardness

The CLD hardness was measured by a method in accordance with JIS K6400 (1997 edition) However, the temperature for the measurement was room temperature (23° C.) Further, the change in hardness was calculated from the CLD hardness measured at room temperature (23° C.) and the CLD hardness measured at a low temperature (−5° C.). Namely, the proportion (%) of the increase in the CLD hardness measured at −5° C. against the CLD hardness measured at 23° C. was obtained.

TABLE 1

|  | Ex. 1 | Ex. 2 | Ex. 3 | Ex. 4 | Ex. 5 | Ex. 6 | Ex. 7 |
| --- | --- | --- | --- | --- | --- | --- | --- |
| Polyol A1 | 20 | 20 | 20 | 20 | 20 | 20 | 20 |
| Polyol B1 | 40 | 40 | 40 | 40 | 40 | 40 | 40 |
| Polyol B2 | 35 | 35 | 32.5 | 33.7 | 37.5 | 32.5 | 40 |
| Polyol C1 |  |  | 2.5 | 1.3 |  | 2.5 |  |
| Monool D1 | 5 | 5 | 5 | 5 | 2.5 | 5 |  |
| Blowing agent | 1.2 | 1.2 | 1.2 | 1.2 | 1.2 | 1.2 | 1.2 |
| Foam stabilizer A | 0.25 | 0.25 | 0.25 | 0.25 | 0.25 | 0.25 | 0.25 |
| Catalyst A | 0.6 | 0.6 | 0.6 | 0.6 | 0.6 | 0.6 | 0.6 |
| Catalyst B | 0.4 | 0.4 | 0.4 | 0.4 | 0.4 | 0.4 | 0.4 |
| Polyisocyanate compound a | 32.5 | 31.7 | 33.5 | 33.0 | 33.1 |  | 32.5 |
| Polyisocyanate compound b |  |  |  |  |  | 33.5 |  |
| Isocyanate index | 105 | 102.5 | 105 | 105 | 105 | 105 | 105 |
| Moldability | ◯ | ◯ | ◯ | ◯ | ◯ | ◯ | ◯ |
| Density (kg/m$^3$) | 70.4 | 69.4 | 66.7 | 66.9 | 65.0 | 68.0 | 76.6 |
| Rebound resilience of core (%) | 7 | 8 | 5 | 6 | 7 | 9 | 7 |
| Air permeability (L/min) | 58.8 | 64.8 | 68.8 | 68.4 | 63.0 | 83.0 | 27.0 |
| 25% ILD (N/314 cm$^2$) | 40 | 32 | 50 | 53 | 35 | 71 | 64 |
| CLD hardness (N/cm$^2$) | 0.110 | 0.094 | 0.147 | 0.150 | 0.103 | 0.210 | 0.188 |
| Change in hardness (%) | 5.1 | 4.9 | 12.1 | 10.4 | 8.3 | 14.7 | 6.1 |
| Tensile strength (kPa) | 108 | 99 | 120 | 94 | 106 | 147 | 130 |
| Elongation (%) | 278 | 283 | 280 | 241 | 285 | 258 | 236 |
| Dry heat compression set (%) | 2.3 | 3.1 | 2.3 | 1.6 | 2.5 | 3.1 | 4.4 |
| Wet heat compression set (%) | 2.4 | 2.8 | 1.8 | 1.6 | 2.7 | 3.3 | 4.6 |

TABLE 2

|  | Ex. 8 | Ex. 9 | Ex. 10 | Ex. 11 | Ex. 12 | Ex. 13 | Ex. 14 | Ex. 15 |
| --- | --- | --- | --- | --- | --- | --- | --- | --- |
| Polyol A1 |  |  |  |  |  |  |  |  |
| Polyol A2 | 20.8 | 20.8 | 19.2 | 27.8 | 27.8 | 22.7 | 21.6 | 25.7 |
| Polyol B1 | 29.2 | 29.2 | 26.9 | 38.9 | 38.9 | 31.8 | 30.2 | 35.9 |
| Polyol B2 | 33.3 | 33.3 | 30.8 | 28.5 | 28.5 | 36.4 | 31.5 | 28.7 |
| Polyol B3 |  |  |  |  |  |  | 2.8 | 2.8 |
| Polyol C1 |  |  |  |  |  |  |  |  |
| Monool D1 | 16.7 | 16.7 | 23.1 | 4.8 | 4.8 | 9.1 | 13.9 | 6.9 |
| Blowing agent | 1.33 | 1.33 | 1.37 | 1.33 | 1.33 | 1.45 | 1.33 | 1.23 |
| Foam stabilizer A | 0.28 | 0.28 | 0.29 | 0.29 | 0.29 | 0.27 |  |  |
| Foam stabilizer B |  |  |  |  |  |  | 0.35 | 0.35 |
| Catalyst A | 0.28 | 0.28 | 0.29 | 0.29 | 0.29 | 0.27 |  |  |
| Catalyst C | 0.19 | 0.12 | 0.19 | 0.11 | 0.11 | 0.18 | 0.07 | 0.07 |
| Catalyst D |  |  |  |  |  |  | 0.35 | 0.35 |
| Polyisocyanate compound a | 30.2 | 31.7 | 31.0 | 31.3 | 32.8 | 33.7 | 30.2 | 29.8 |
| Isocyanate index | 102 | 107 | 107 | 102 | 107 | 105 | 102 | 102 |
| Moldability | ◯ | ◯ | ◯ | ◯ | ◯ | ◯ | ◯ | ◯ |
| Density (kg/m$^3$) | 58.8 | 61.5 | 58.3 | 59.1 | 60.7 | 55.5 | 56.9 | 56.6 |
| Rebound resilience of core (%) | 11 | 9 | 11 | 13 | 11 | 10 | 13 | 13 |
| Air permeability (L/min) | 42.8 | 60.0 | 91.5 | 39.8 | 38.8 | 40.4 | 47.3 | 39.3 |
| 25% ILD (N/314 cm$^2$) | 65 | 80 | 65 | 77 | 94 | 72 | 73 | 77 |
| CLD hardness (N/cm$^2$) | 0.192 | 0.237 | 0.184 | 0.222 | 0.245 | 0.188 | 0.201 | 0.211 |
| Change in hardness (%) | 6.5 | 7.5 | 6.2 | 6.6 | 6.9 | 5.8 | 6.1 | 5.5 |
| Tensile strength (kPa) | 65 | 71 | 57 | 77 | 94 | 60 | 61 | 66 |
| Elongation (%) | 195 | 147 | 155 | 231 | 179 | 190 | 209 | 214 |

TABLE 2-continued

| | Ex. 8 | Ex. 9 | Ex. 10 | Ex. 11 | Ex. 12 | Ex. 13 | Ex. 14 | Ex. 15 |
|---|---|---|---|---|---|---|---|---|
| Dry heat compression set (%) | 3.2 | 3.7 | 4.0 | 4.3 | 5.8 | 3.1 | 2.3 | 1.7 |
| Wet heat compression set (%) | 2.9 | 2.8 | 3.7 | 3.6 | 3.4 | 2.7 | 1.4 | 1.5 |

With the flexible polyurethane foams in Examples 1 to 6 prepared by using the specific polyols (A), (B) and monool (D), as shown in Table 1, the rebound resilience is at most 15%, and the change in hardness by a temperature change is little. Further, they are excellent also in mechanical properties such as tensile strength and elongation. Further, the dry heat compression set as an index for the durability is as small as at most 5%, and thus, the durability is good. Further, the air permeability is also at least 30 L/min, thus showing that flexible polyurethane foams having very high air permeability were obtained. On the other hand, in Example 7, the flexible polyurethane foam obtained was poor in air permeability, since the specific monool (D) was not used.

With the flexible polyurethane foams in Examples 8 to 15, as shown in Table 2, the moldability was good even by foaming in a large size. Further, the rebound resilience is at most 15%, and the change in hardness by a temperature change is also little. Further, they are excellent also in the mechanical properties such as elongation. Further, the dry heat compression set as an index of the durability is also small, and thus, the durability is good. Further, the air permeability is also at least 30 L/min, thus showing that flexible polyurethane foams having very high air permeability were obtained.

Example 16

A mixture (polyol system) of all materials other than the polyisocyanate compound among the materials and blend agents shown in Example 5 in Table 1, was adjusted to a liquid temperature of 23° C.±1° C., and the polyisocyanate compound was adjusted to a liquid temperature of 22±1° C. To the polyol system, the polyisocyanate compound was added in a prescribed amount, followed by mixing for 5 seconds by a mixer (rotational speed: 3,000 rpm), and the obtained mixed liquid was immediately injected into an aluminum mold (400 mm in length, 400 mm in width and 100 mm in height) heated to 60° C. and sealed. After maintaining the mold temperature at 60° C. for 6 minutes, the flexible polyurethane foam was taken out from the mold.

As a result, the flexible polyurethane foam (mold foam) was prepared with good moldability. Further, the prepared flexible polyurethane foam was aged for at least 24 hours at 23° C. under a relative humidity of 50%, whereupon various physical properties were measured. As a result, a flexible polyurethane foam having a low rebound resilience and excellent air permeability was prepared, which had a core density of 71.1 kg/m$^3$, a rebound resilience of core of 4% and an air permeability of 31.3 L/min.

INDUSTRIAL APPLICABILITY

The flexible polyurethane foam of the present invention has low resilience, and it is suitable as a shock absorber, a sound absorber or a vibration absorber, and also suitable for bedding, mats, cushions, seat cushions for automobiles, backing materials or skin wadding materials by frame lamination. It is particularly suitable for bedding (mattress, pillows, etc.)

The entire disclosure of Japanese Patent Application No. 2005-123582 filed on Apr. 21, 2005 including specification, claims and summary is incorporated herein by reference in its entirety.

What is claimed is:

1. A process for producing a flexible polyurethane foam, which comprises reacting a polyol mixture with a polyisocyanate compound in the presence of a urethane-forming catalyst, a blowing agent and a foam stabilizer, characterized in that the polyol mixture comprises polyol (A), polyol (B) and monool (D), and the proportion of the polyisocyanate compound to all active hydrogen-containing compounds in the mixture is at least 90 by isocyanate index, wherein:

Polyol (A) is a bifunctional polyoxypropylene polyol having a hydroxyl value of from 10 to 60 mgKOH/g, obtained by ring-opening addition polymerization of an alkylene oxide to an initiator using a double metal cyanide complex catalyst;

Polyol (B) is a polyoxypropylene polyol having a hydroxyl value of from 100 to 250 mgKOH/g;

Monool (D) is a polyoxypropylene monool having a hydroxyl value of from 10 to 200 mgKOH/g;

the proportion of the total of the polyol (A) and the polyol (B) is at least 75 mass % based on 100 mass % of the polyol mixture;

the proportion of the monool (D) is from 1 to 30 parts by mass per 100 parts by mass of the total of the polyol (A) and the polyol (B);

the flexible polyurethane foam does not comprise plasticizer; and the flexible polyurethane foam has a rebound resilience of the core of at most 15% and an air permeability of from 30 to 100 L/min.

2. The process for producing a flexible polyurethane foam according to claim 1, wherein the proportions of the polyol (A) and the polyol (B) are such that the proportion of the polyol (A) to the total of the polyol (A) and the polyol (B) is from 5 to 50 mass %.

3. The process for producing a flexible polyurethane foam according to claim 1, wherein polyol (B) is obtained by ring-opening addition polymerization of propylene oxide to an initiator using an alkali metal compound catalyst, and wherein polyol (A) is obtained by ring-opening addition polymerization of propylene oxide to an initiator using a double metal cyanide complex catalyst.

4. The process for producing a flexible polyurethane foam according to claim 1, wherein the blowing agent is water.

5. The process for producing a flexible polyurethane foam according to claim 1, wherein the monool is obtained by ring-opening addition polymerization of only propylene oxide to an initiator.

6. The process for producing a flexible polyurethane foam according to claim 1, wherein the polyisocyanate compound is at least one member selected from the group consisting of tolylene diisocyanate (TDI), diphenylmethane diisocyanate (MDI), polymethylenepolyphenyl polyisocyanate (crude MDI), xylylene diisocyanate (XDI), isophorone diisocyanate (IPDI), hexamethylene diisocyanate (HMDI) and their derivatives.

7. The process for producing a flexible polyurethane foam according to claim 1, wherein the polyol mixture further comprises a polyol (C) in an amount of at most 10 mass % based on the entire polyol mixture, and wherein polyol (C) is a polyol having an average of 2-6 hydroxyl groups and a hydroxyl value of from 300 to 1,830 mgKOH/g.

8. A flexible polyurethane foam produced by the process according to claim 1.

9. The flexible polyurethane foam according to claim 8, which has a density of from 40 to 110 kg/m$^3$.

* * * * *